Patented Dec. 12, 1950

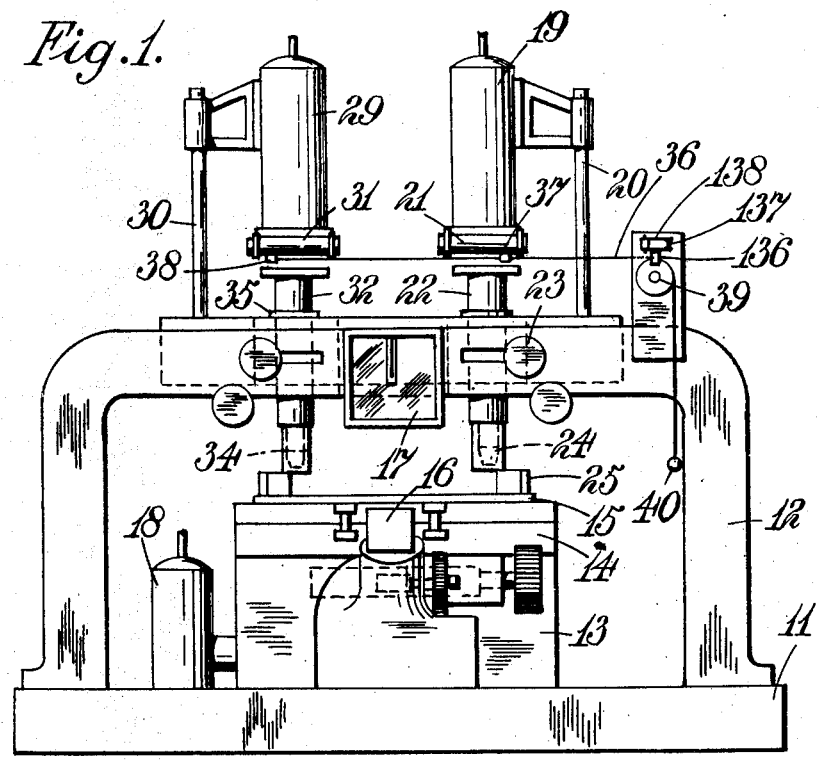

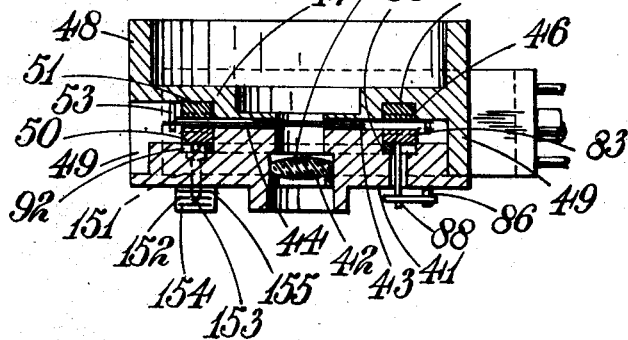
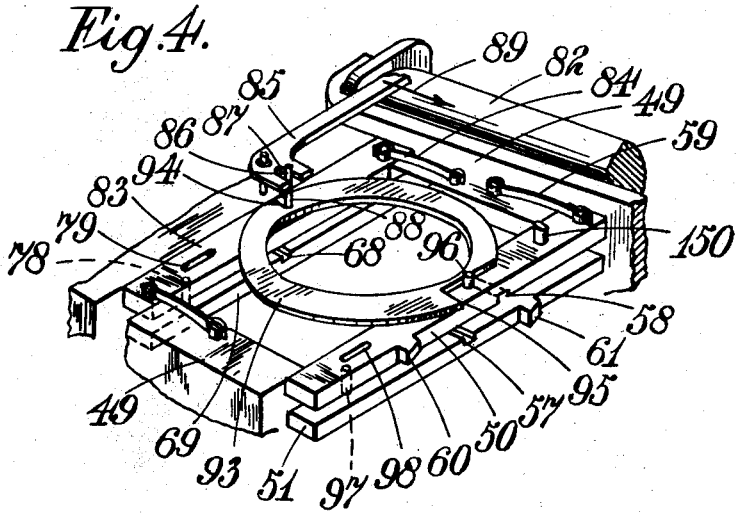
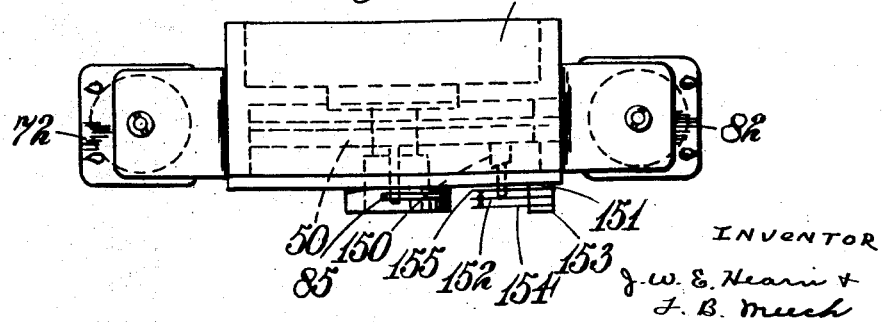

2,533,800

UNITED STATES PATENT OFFICE 2,533,800

CAMERA SHUTTER

James William Edward Hearn and Frank Button Meech, Slough, England, assignors to Optical Measuring Tools Limited, Slough, England, a British company Application July 8, 1947, Serial No. 759,552
In Great Britain May 15, 1946

Section 1, Public Law 690, August 8, 1946
Patent expires May 15, 1966

6 Claims. (Cl. 95—60)

This invention comprises improvements in or relating to camera shutters. For certain purposes the exact length of a photographic exposure may be critical. For example if a series of exposures is to be made all of which are to produce images of like depth of tone under similar conditions of development, the exposure must be constant and it is an object of the present invention to provide a shutter which will afford an exposure which can be repeated with a minimum of variation.

In particular, in making successive exposures of an image of a line upon a sensitised surface for the purpose of producing scales with exceedingly fine lines, straight or otherwse, it is important that the successive exposures should not materially differ from one another if the lines which are to be produced are to appear uniform upon development, and the present invention provides a shutter which is of particular value in this connection.

According to the present invention, a camera shutter and means for operating the same comprises a shutter member or members, means under the control of electric impulses for opening and closing the shutter member or members and means for despatching impulses thereto with exact time intervals between them to open and close the shutter.

Means may be provided under the control of an operator for rendering active the means for despatching impulses with exact time intervals between them.

The means for despatching electric impulses may be constituted by a clock which carries signals contacts electrically connected to the means for opening and closing the shutter member or members.

The invention includes a camera shutter comprising a shutter member for opening the shutter, a signal shutter member for closing the shutter, means for operating each member in turn under an electric impulse, a capping member and means for operating the capping member and thereupon resetting the opening and closing shutter members after operation thereof.

The following is a description, by way of example, of one construction in accordance with the invention, reference being made to the accompanying drawings in which:

Figure 1 is a front elevation of the apparatus comprising the shutter,

Figure 2 is an underside plan of the shutter mechanism,

Figure 3 is a section on the line 3—3 of Figure 2,

Figure 4 is a perspective view of part of the operative mechanism of the shutter, Figure 5 is a front elevation of the shutter.

Figure 6:
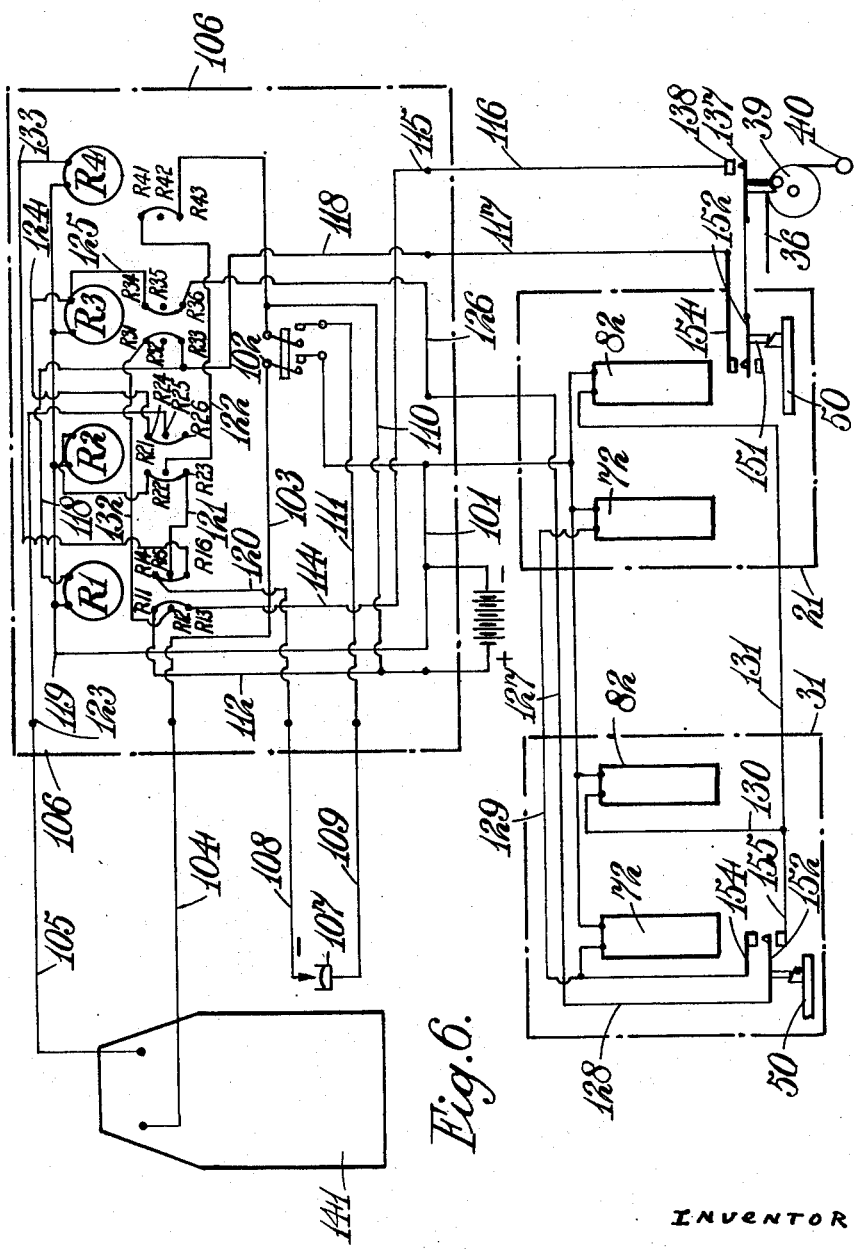
Figure 6 is a connection diagram.

The shutter about to be described is intended to take the place of the shutter for explosing lines which are to be produced on a scale, and Figure 1 of the drawings of the present application shows an apparatus comprising a base 11, on which is supported a bridge 12, which spans the space above an optical dividing table 13 having a circular rotatable head 14 on which is mounted a circular photographically sensitised glass plate 15. The optical table has a circular graduated scale and comprises a prism 16 for directing an image of the graduations of the scale on to a projection screen 17. Illumination for this purpose is provided by a lantern 18 and in this way the operator can set the table 14 in any desired position of angular adjustment with great exactitude. These parts are in themselves well-known.

On the bridge 12 above the table and the plate 15 there are mounted two optical projecting apparatus one of which consists of a lantern 19 supported on a bracket 20 and provided with a shutter 21 in which is also mounted a condenser lens for directing light downwardly through a vertical tube 22 adjustable by a knob 23 and provided at its lower end with a projection lens 24 similar to an ordinary microscope objective. The tube 22 contains a narrow slit the image of which is focussed to reduce its scale on the surface of the sensitised plate 15 whenever the shutter 21 is opened.

It will be understood that the slit in the tube 22 is positioned so that its image on the plate 15 is radial, and that for every position in which the plate 15 is set the operator will cause the shutter 21 to open and thereby impress a photographic image of the slit on the plate 15 at that position, this image when the plate is developed serving to constitute one of the scale divisions on the plate. In order that the scale divisions may all be equally black when developed, it is essential that the time of the opening of the shutter 21 should be exactly alike for every exposure, and the object of the construction of the shutter according to the present invention is to ensure this. In order to assist focussing of the image by the projection lens 24 a slip gauge 25 may be provided so that the knob 23 can be operated before making an exposure to the point at which the bottom end of the tube 22 engages the slip gauge 26, whereupon the lens will be in focus. This is particularly desirable because, as will be appreciated, the apparatus must be operated throughout within a dark room so that the plate 15 does not become fogged.

On the part of the bridge 12 which overlies the opposite side of the plate 15 from that which is aligned with the tube 22 there is another projection apparatus comprising a lantern 29 on a bracket 30, a shutter 31, a projection tube 32, an adjusting knob 33 and a projection lens 34, these parts being similar to those already described in connection with the shutter 21, but in this case the tube 32 instead of containing a slit the image of which is projected on to the plate 15, will contain a mounting for a film on which are inscribed a series of numbers corresponding to the numbers of the division marks on the scale which is to be photographically inscribed on the plate 15. The actual details of the film mounting are not shown in the drawing, but the gate through which the film passes is indicated at 35. The operator, when he makes an exposure to inscribe a line upon the scale at one side of the plate, simultaneously operates the shutter 31 to inscribe a number on the scale at the opposite side of the plate and the film passing through the gate 35 is so synchronised that the series of numbers which it inscribes on the plate correspond to the scale divisions. The time of production of the scale is thereby reduced because the numbering of the divisions and the making of the division marks proceed simultaneously. The shutters 21, 31, are operated simultaneously by means of a pull-cord 36 which engages setting members 37, 38 on the shutters and which passes over a pulley 39 carrying a knob 40 at its end. When the operator pulls the knob 40 he sets the two shutters and owing to the electrical connections hereinafter described, the effect is that an electric clock, indicated at 141, Figure 6, thereafter sends out impulses which operate both the shutters 21 and 31, making an exposure. The shutters will not again operate until the operator resets them by pulling the knob 40 so that he has time to make an adjustmment of the table 14 to the position for the next mark. Thereupon, when he pulls the knob 40, a fresh exposure will be made.

Coming now to the construction of the shutters 21, 31, these are alike and are shown in Figures 2, 3 and 4. Referring to Figure 3, the parts comprise a frame plate 41 to constitute the condenser mounting which is provided in the centre with an aperture to receive the condenser lens 42. The plate is thickened in a direction parallel with the axis of the lens 42 to provide a tabular portion 43 over which the shutter plates 44, 45, 46, work. The three shutter plates are viewed edgewise in Figure 3 and they are overlaid by a cover plate 47 which is spaced sufficiently from the tabular portion 43 to provide room for the shutter plates, which are very thin. The cover plate 47 forms part of a casing 48 which is adapted to fit over the lower end of the lantern 19 or 29 as the case may be and which is provided with a projecting rim 49 to fit against the condenser mounting 41 around the edge and so to hold the parts rigid when screwed together.

In Figure 2 the condenser mounting 41 has been taken away so as to show the shutter plates 44, 45, 46, and the parts which operate them. In Figure 4, which is a perspective view, the parts are also looked at from the underside, as in Figure 2, that is to say, the shutter is shown upside down with the condenser mounting taken away, the operating parts for the shutter plates shown spaced a little away from each other, and the shutter plates themselves removed. All the central part of the cover plate 47 is also broken away in Figure 4, this having been done to avoid confusing the drawing by the inclusion of parts other than the operating parts of the shutter.

Along one edge of the aforesaid tabular portion 43 of the condenser mounting plate the tabular portion is formed to guide a rectangular bar 50 which constitutes a shutter-opening slider bar. Above the bar 50 (when the shutter is in working position) is another bar 51 which constitutes a shutter-closing slider bar. Between these two bars work the shutter-closing plate 44 and the shutter-opening plate 45. These two plates are kidney-shaped members pivoted on pins 52, 53, respectively. The shutter-opening plate 45 carries an operating pin 55 which works in a cross-slot 58 cut in the shutter-opening slider bar 50. Similarly, the shutter-closing plate 44 carries an operating pin 54 which works in a cross-slot 57 cut in the shutter-closing slider bar 51. The shutter-opening slider bar 50 is spring urged to the left, as viewed in Figure 2, by a leaf-spring 59, but is normally held from movement under the influence of the spring by means of a catch 60 which is formed on the slider bar 50 and is engaged by a detent 70 formed as an extension of an armature 71 of an electromagnet 72. If the electromagnet 72 is energised the armature 71 is attracted, the detent 70 is moved out of the path of the projection 60, and the slider bar 50 moves to the left, as viewed in Figure 2, carrying with it the operating pin 55 and thereby flicking open the shutter-opening plate 45. The shutter-closing slider bar 51 is likewise spring urged to the left by a spring, not shown in the figures, but similar to the spring 59, and is held up from movement by a projection 61 engaged by a detent 80 on an armature 81 operated by an electromagnet 82. If this magnet is energised the shutter-closing slider bar will be released and will move to the left, carrying with it the operating pin 54 of the shutter-closing plate 44, thus closing the shutter. The interval between energisations of the electromagnets 72, 82, determines the interval during which the shutter remains open. By supplying two current impulses, one to magnet 72 and the other to magnet 82 at an exact interval of time, the one from the other, the time of exposure by the shutter will be exactly determined.

When the shutter has been operated in this manner, before another exposure can be made it is necessary that it should be reset. If resetting were effected by merely reversing the movement of the shutter plates 44, 45, another exposure would be made in the course of resetting, which would of course be objectionable. Accordingly, on the opposite side of the cover plate 47 from that on which the slider bars 50, 51, work, there is pivoted at 66 the before-described shutter plate 46 which constitutes a capping plate. The capping plate has an operating pin 67 which works in a transverse slot 68 in a shutter-capping slider bar 69. This slider bar carries a pin 78 which works in a slot 79 in a resetting slider bar 83. The resetting slider bar 83 is urged by a pair of springs 84, 184, in the direction towards the right, as viewed in Figure 2, and in this position the pin 78 comes in engagement with the left-hand end of the slot 79 and is urged by the springs 84, 184, in the direction to carry the shutter-capping slider bar 69 also to the right far enough to move the shutter-capping plate 46 into the position shown in Figure 2 where it is clear of the shutter opening, and this is the normal position of the capping plate. When the shutter is to be reset, however, the resetting slider bar 83 is moved to the left against its spring. This movement is effected by a lever 85 (Figure 4) pivoted at 86 and having a slot 87 which engages a pin 88 projecting from the resetting slider bar 83. Movement of the lever 85 in the direction indicated by the arrow 89 will, therefore, move the resetting bar 83 to the left against the springs 84, 184, and one effect of this movement will be to permit the pin 78 on the capping bar 69 to move to the left, the capping bar 69 being also spring urged in this direction. Consequently, the capping plate 46 will move over to cover the shutter-opening 90. When the capping bar has covered the opening it will not be able to move any further as it is made long enough to abut at 91 against the end of its cutting slot, but this will not prevent further movement of the resetting bar 83 owing to the freedom of movement permitted by the slot 79.

A circular groove 92 is cut in the condenser mounting plate 41 and in this groove there works a resetting-cam comprising a ring 93 which can be seen in Figure 3, but the action of which can best be studied from Figure 4. This ring is omitted from Figure 2 in order to permit a full view of the parts which lie behind it as viewed in that figure. The resetting ring 93 can slide around its groove 92 which is concentric with the shutter-opening 90 and it is slotted at 94 to engage the pin 88. Therefore its movements partake of the movements of the resetting bar 83. Diametrically opposite to the slot 94 the ring 93 is notched out as shown at 95 and engages a pin 96 on the shutter-opening slider bar 50. As a result, when the resetting bar 83 has moved far enough to permit the capping plate 46 to uncover the shutter opening, the notch 95 engages the pin 96 and moves the shutter-opening slider bar to the right far enough to carry the shutter-opening plate back into the position shown in Figure 2 where it obturates the opening 90. At the same time the shutter-closing slider bar 51 is carried to the right by engagement of a pin 97 which it carries with a slot 98 in the slider bar 50. Thus, the shutter-closing plate 44 is reset to the position shown in Figure 2. Both the slider bar 50 and the slider bar 51 are held in their reset positions by the projections 60, 61, re-engaging with the detents 70, 80, respectively. If the operator at this stage releases the lever 84 the resetting bar 83 and ring 93 will be returned to their initial position by the springs 84, 184, and the pin 78 will be carried by engagement with the end of the slot 79 to the right, as viewed in Figure 2, thus returning the capping slider bar 69 to its initial position and bringing the capping plate 46 into the position shown in Figure 2, the shutter now being entirely reset. The spring which urges the capping slider bar 69 to the left, as viewed in the figures, is weaker than the two springs 84, 184, which urge the parts to the right, which fact ensures that this operation can take place as described.

The lever 85 carries at its end the setting members 37 or 38, as the case may be, hereinbefore referred to, which are connected to the resetting knob 40. The pulley 39 over which the cord 36 passes which is connected to the resetting knob 40 is fastened to the cord at a suitable point of its periphery and carries a projection 136 which, when the cord returns to its initial position after the knob 40 is released, engages a contact 137 and presses it into engagement with a contact 138. During the resetting period, however, when the knob 40 is pulled, the contacts 137, 138, are broken for a reason which will hereinafter appear.

On the slider bar 50 there is a cam member 150 having a sloping upper face which engages a push-rod 151 passing through the metal of the plate 41 in which the condenser lens 42 is mounted. The push-rod 151 engages a spring contact member 152 held in an insulating block 153 on the back of the plate 41. The contact member 152 plays between contact members 154, 155, and when the shutter has been set in readiness for operation the push-rod 151 has pushed the contact member 152 into engagement with the contact member 154, while when the shutter is released and the opening slider bar 50 has moved to the left the contact member 152 moves down into contact with the contact member 155, breaking the circuit through the contact member 154. These electrical interlock contacts on the shutters are employed in the electrical circuit shown in Figure 6 and the electrical connections will now be described.

As already stated, the impulses which first open the shutter by energising the magnet 72 and then close it by energising the magnet 82 are derived from a clock mechanism 141. There is a well-known type of pendulum-driven electric master clock which is capable of sending out signals at exact intervals of one second, and these signals are utilised according to the present invention to operate suitable relays which pass on impulses to the magnets 72, 82. The impulses are conveyed from battery negative by the line 101 to a one pole of a double-pole switch 102 and thence by lines 103 and 104 to the clock and from the clock by line 105 to relay board 106, which is indicated in Figure 6 by a chain line. In addition, a pair of auxiliary contacts 107 are closed by the clock pendulum at the end of every double swing of the pendulum, thus giving a further impulse which it will be convenient to trace from battery position by line 110, switch 102, lines 111, 109, to line 108 every two seconds. These auxiliary impulses by line 108 occur intermediately between successive pairs of one-second impulses by line 105.

The relay board 106 carries four relays $R_1$, $R_2$, $R_3$, $R_4$, each of which has six contacts below it of which the three left-hand contacts of the relay $R_1$ are numbered respectively $R_{11}$, $R_{12}$, $R_{13}$, and the three right-hand contacts are $R_{14}$, $R_{15}$, $R_{16}$. Similarly, the left-hand contacts of the relay $R_2$ are designated $R_{21}$, $R_{22}$, $R_{23}$, and the right-hand contacts $R_{24}$, $R_{25}$, $R_{26}$. Those of the relay $R_3$ are numbered $R_{31}$ to $R_{36}$ in a corresponding manner and the relay $R_4$ has only the left-hand series of contacts in use, namely, numbers $R_{41}$ to $R_{43}$ inclusive. When the relay is unenergised the connections are made as shown in the drawing, that is to say, from the uppermost to the lowermost contact on both sides, but when any relay is energised this connection is broken and the central contact is connected to the uppermost one, that is to say, $R_{11}$ to $R_{12}$, $R_{14}$ to $R_{15}$, $R_{21}$ to $R_{22}$, and so on.

Assuming now that the shutters have been set by pulling on the knob 40, thus moving the slider bars 50 of the shutters 21 and 31 to the right, as viewed in Figure 6 and closing the contacts 152, 154. As soon as the knob 40 has been released and the wheel 39 has come back to its initial position the contacts 137, 138 are closed and a circuit is completed which extends from battery positive by way of line 112, contacts $R_{11}$, $R_{13}$, line 114 to terminal 115 and thence by line 116 through contacts 138, 137, 152, 154, back to the relay board through line 117 and thence by line 118 to the coil of relay $R_1$, the other terminal of which is connected by a common negative line 119 to the negative of the battery. Relay $R_1$ operates, breaking the circuit through which it was operated, by disconnecting $R_{11}$ from $R_{13}$ but immediately reconnecting $R_{11}$ to $R_{12}$, which is connected by line 132 and contacts $R_{31}$, $R_{33}$, to line 118. The relay therefore holds itself on.

At the same time the circuit is made through the auxiliary line 108 from the auxiliary contacts 107 on the clock through line 120, contacts $R_{14}$, $R_{15}$, line 121 and contacts $R_{23}$, $R_{21}$, to the coil of relay $R_2$ and thence by line 119 to battery negative. Therefore, as soon as one of the auxiliary impulses comes through from the clock, relay $R_2$ operates. It closes a hold-on circuit for itself through line 110, contacts $R_{43}$, $R_{41}$, line 122, contacts $R_{22}$, $R_{21}$, and it also completes a circuit through line 123 from the signal line 105 of the clock through contacts $R_{25}$, $R_{24}$, and line 124 to the coil of relay $R_3$. Therefore, as soon as the clock sends the first of the one-second impulses which follows the auxiliary impulse through line 108, relay $R_3$ will close. At the same time the signal coming in through line 105 from the clock is passed on through line 125, contacts $R_{34}$, $R_{36}$, of relay $R_3$, line 126 and 127 to the contact 152 of the shutter 31 and thence through contact 154 and lines 128, 129, to the magnets 72 of both the shutters 21 and 31, thus releasing the shutter-opening bars 50 of both shutters and opening the shutters. The impulse which is passed on by the lines 126, 127, in this way is cut short by the operation of relay $R_3$, which opens the contact $R_{36}$ and therefore the magnets 72, after release of the slider bar 50, are immediately de-energised. This is important because the slider bars 50 as they move open the contacts 152, 154, and connect the line 127 to the contact 155 of shutter 31 in order that the next impulse coming in on the line 105 may energise the shutter-closing magnets 82, 82, by way of the lines 130, 131. The relay $R_3$, when it operates, also breaks the circuit of line 132 through the contacts $R_{31}$, $R_{33}$, and relay $R_1$ falls off. Relay $R_3$, which was only momentarily operated by the impulse through line 105, falls off again and reconnects contacts $R_{34}$, $R_{36}$. Consequently, the next impulse, exactly one second later, coming in through line 105 again energises the shutters by way of line 123, contacts $R_{25}$, $R_{24}$, line 124, line 125, contacts $R_{34}$, $R_{36}$, lines 126, 127, and contacts 152, 155, so energising the shutter-closing magnets 82, 82, of the shutters 21 and 31.

After this another two-second impulse comes in by way of line 108, and as relay $R_1$ has fallen off in the interval, this impulse is connected through line 120 by way of contacts $R_{14}$, $R_{16}$, to line 133 and the coil of relay $R_4$. Relay $R_4$ operates, breaking the circuit through contacts $R_{41}$, $R_{43}$, and line 122 by which relay $R_2$ is holding itself on. Relay $R_2$ therefore falls off and breaks the circuit through line 105 and line 123 by which impulses are sent to the shutters. No further operation can take place until the shutters have been reset by operating the knob 40 whereupon the cycle of operations recommences.

Preferably a warning light is connected to the circuit in such a manner that it is lighted when the shutter is set and goes out when the shutter has been operated.

We claim:

1. A camera shutter and means for operating the same comprising in combination a clock, an electrical circuit comprising a signal line and contacts in the signal line operated by the clock to establish successive electrical impulses in the signal line at predetermined intervals of time, a frame plate comprising a shutter-opening, two movable shutter plates each capable of movement between obturating position and open position relative to said shutter-opening, two electrically responsive means under the control of said impulses each for operating one of said shutter plates, one said shutter plate being spring-urged to open and being held closed, when the shutter is set, by a detent, the detent being controlled by the first of said electrically responsive means, the other said shutter plate being spring-urged to close and being held open by a detent controlled by the other said electrically responsive means, both said electrically responsive means, when operated, acting in a direction to release said detents, switch means automatically operable upon receipt of a first impulse in the signal line and serving to dispatch said first impulse to one of the said two electrically-responsive means to open the shutter plate controlled thereby and simultaneously to change the circuit to despatch the next impulse to the other of said electrically responsive means to close the shutter-plate controlled thereby, and manually-operated resetting means for the shutter plates.

2. A shutter as claimed in claim 1 wherein the shutter plate which closes the shutter-opening is operatively connected to switch means for changing the electric circuit so that further electrical impulses from the clock are ineffective to operate the shutter until the shutter is re-set.

3. A shutter as claimed in claim 1 wherein the manually operated resetting means comprises a manually operable lever, a resetting-cam linked thereto and operated thereby, a capping plate, spring means to urge the capping plate to open position relative to said shutter-opening, means associated with the manually operable lever to move the capping plate to obturating position, and resetting means for the shutter plates operated by the said cam after the capping plate has reached obturating position.

4. A shutter as claimed in claim 1 wherein the shutter plates are pivoted members, the pivots of the plates are each located laterally of the shutter opening, slider bars are slidably located alongside said opening and close to said pivots, to one of each of which each shutter plate is operatively connected, and the slider bars are provided with abutments for engagement by the detents.

5. A shutter as claimed in claim 4 wherein a resetting ring surrounds the shutter opening and is provided with means to engage the slider bars and means to rotate the ring about the axis of the shutter opening to return the slider bars and shutter plates to initial position after the shutter has been operated.

6. A shutter as claimed in claim 1 wherein the shutter plates are pivoted members, the pivots of the plates are each located laterally of the shutter opening, slider bars are slidably located alongside said opening and close to said pivots, to one of each of which each shutter is operatively connected, said slider bars being provided with abutments for engagement by the detents, and said automatically operable switch means being located adjacent to the slider bar which operates the opening shutter plate and this slider bar carrying a cam for automatically operating said switch means.

JAMES WILLIAM EDWARD HEARN.
FRANK BUTTON MEECH.

REFERENCES CITED

The following references are of record in the file of this patent:

UNITED STATES PATENTS

| Number | Name | Date |
|---|---|---|
| 429,929 | Luce | June 10, 1890 |
| 716,021 | Folmer | Dec. 16, 1902 |
| 1,135,032 | Lattau | Apr. 13, 1915 |
| 1,920,973 | Dinzl | Aug. 8, 1933 |
| 1,963,107 | Walters | June 19, 1934 |
| 2,298,787 | Fassin | Oct. 13, 1942 |
| 2,346,079 | Newton | Apr. 4, 1944 |
| 2,400,778 | Osborne | May 21, 1946 |
| 2,402,965 | Hornberger | July 2, 1946 |
| 2,420,874 | Fowler | May 20, 1947 |

FOREIGN PATENTS

| Number | Country | Date |
|---|---|---|
| 553,949 | Great Britain | June 11, 1945 |